Figure 1:
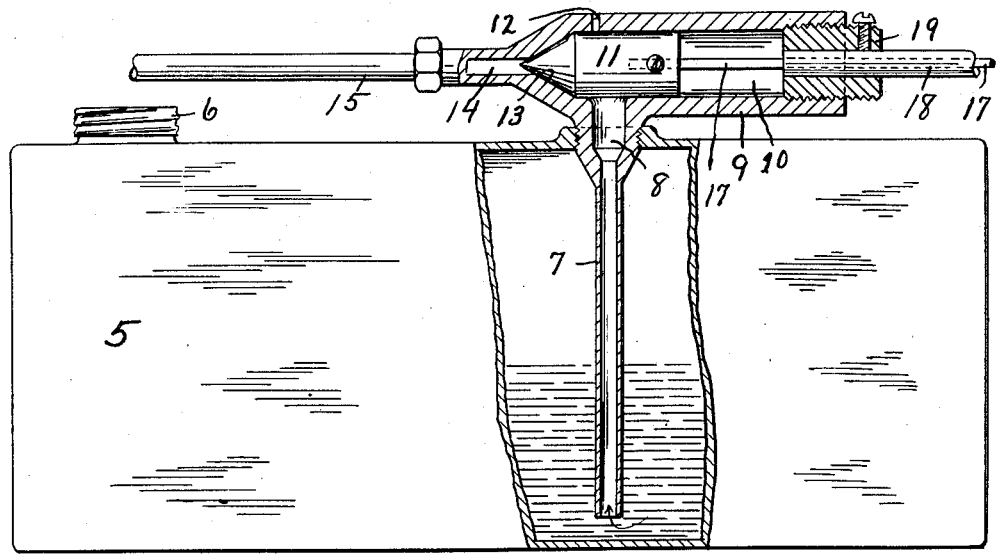

J. N. HOGG.
AUXILIARY AIR VALVE AND DECARBONIZER FOR EXPLOSION ENGINES.
APPLICATION FILED MAR. 11, 1913.

1,091,843.

Patented Mar. 31, 1914.

Witnesses.
Frank Waterfield.
E. P. Parkes

Inventor.
John N. Hogg.
by Marshall Tilden
Attorney.

UNITED STATES PATENT OFFICE.

JOHN N. HOGG, OF LOS ANGELES, CALIFORNIA.

AUXILIARY AIR-VALVE AND DECARBONIZER FOR EXPLOSION-ENGINES.

1,091,843. Specification of Letters Patent. Patented Mar. 31, 1914.

Application filed March 11, 1913. Serial No. 753,544.

*To all whom it may concern:*

Be it known that I, JOHN N. HOGG, a citizen of the United States, residing at the city of Los Angeles, in the county of Los Angeles and State of California, have invented new and useful Improvements in Combined Auxiliary Air-Valves and Decarbonizers for Explosion-Engines, of which the following is a specification.

My invention relates primarily to a device for controlling the admission of water or other decarbonizing liquid into the manifold of an explosion engine in the form of a fine spray and which can be used as an auxiliary air valve if desired, and the main object thereof is to provide a cheap, simple and efficient device for that purpose which is capable of accurate regulation.

Another object is to provide a device which can be easily and quickly attached to an explosion engine without any displacement or alteration of any of the parts thereof.

Figure 4:
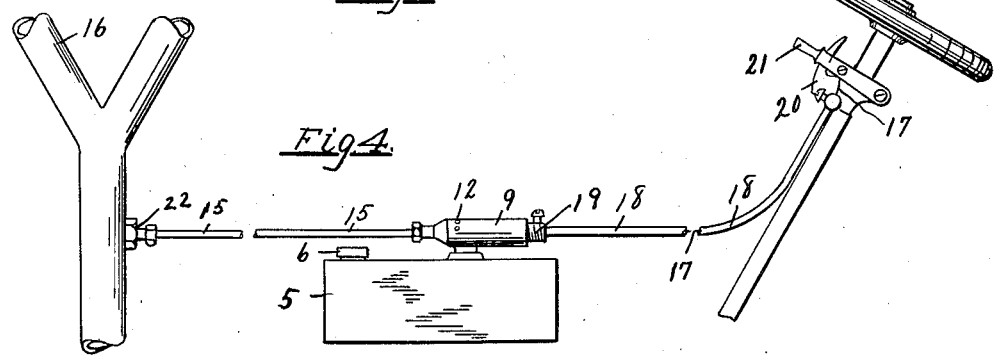
Figure 3:
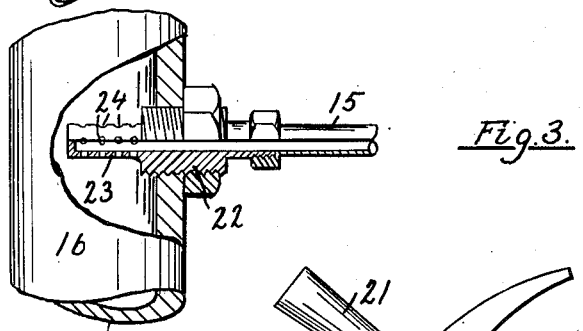
Figure 2:
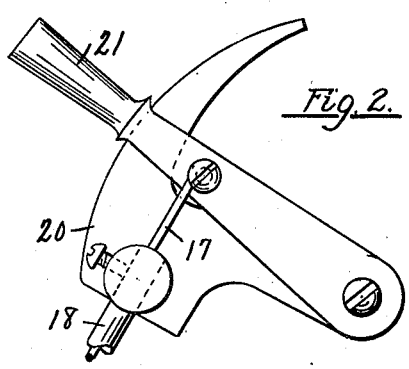

I accomplish these objects by the device described herein and illustrated in the drawings forming a part hereof; in which;

Figure 1 is a side elevation partly in section of the supply tank and its attendant parts. Fig. 2 is an elevation of the operating lever. Fig. 3 shows a section of the manifold showing the manner of attaching my device thereto. Fig. 4 is a diagrammatic view of my device as attached to an automobile.

While I have shown my device as adapted for an automobile and will describe it as so used it will be understood that I do not limit myself to such use.

In the drawings 5 is a supply tank having a filler opening closed by a cap 6 near one end thereof. A spray tube 7 extends from nearly the bottom of the tank 5 and extends upwardly and is connected to a spray port 8 in casing 9 which casing 9 is secured to the top of tank 5 in any suitable manner. Spray port 8 extends upwardly and connects with a valve chamber 10 in which is slidably mounted an operating valve 11. Air inlet ports 12 are provided in casing 9 opposite spray port 8. A valve seat 13 is provided at one end of chamber 10 upon which valve 11 is adapted to be seated when the device is in an inoperative position. A supply port 14 extends from chamber 10 centrally of the valve seat 13 and is connected by supply pipe 15 to the manifold 16 of the engine. Valve 11 is connected at the end opposite the seat 13 to and operated by the inner or movable wire 17 of a Bowden wire whose outer flexible, tubular casing 18 is secured at one end to a plug 19 in the end of casing 9 and at the other end to a support 20 located in any suitable position but preferably upon the steering post of the automobile and carrying a handle 21 pivotally mounted upon said casing support and connected to the inner wire 17 of the Bowden wire. The Bowden wire herein referred to is that described in patent to E. M. Bowden, No. 609,570, dated August 23, 1898.

A nozzle 22 is mounted upon the manifold end of supply pipe 15 and is screwed into the manifold and has an inwardly extending hollow tip or projection 23 extending into the manifold provided with ports or openings 24.

In operation the tank is filled with a suitable supply of liquid. The engine is then started. Lever or handle 21 is then operated to withdraw valve 11 from its seat and the suction of the engine will then operate to draw air into chamber 10 through ports 12 and liquid through spray tube 7 and spray port 8 in the form of a fine spray into the said chamber where they will unite and pass into the manifold of the engine and thence to the cylinders of the engine. As soon as the spray enters the cylinders it will be turned into steam by the heat thereof which will absorb the carbon in the cylinders and pass out through the exhaust.

It will be seen that the device can be used as an auxiliary air valve by leaving the tank empty.

Having described my invention what I claim is;

1. A decarbonizing device for explosion engines comprising a fluid tank; a valve casing having ports therein with the front edge of both in a plane which passes transversely of the casing, one of said ports being smaller than the other and constituting an air port; a pipe extending from the larger of said ports and terminating in an open end near the bottom of the tank; a pipe leading from the front end of said valve casing and terminating in the manifold of the engine; a valve in said casing to control the ports therein; and means to operate said valve.

2. A decarbonizer comprising a water tank having a port in the top thereof; a valve chamber having a port in the bottom of the casing thereof connected to said tank at the port in the top thereof; a spray pipe opening into the port in the valve chamber casing and projecting downwardly in said tank to near the bottom thereof; a valve in said valve chamber; and a connection from said valve chamber casing to and opening into the manifold of the engine; and means to operate said valve.

3. A decarbonizer comprising a water tank having a port in the top thereof; a valve chamber having a port in the bottom of the casing thereof connected to said tank at the port in the top thereof; a pipe opening into the port in the valve chamber casing and projecting downwardly in said tank to near the bottom thereof; another port in said valve chamber casing for the admission of air, said last port being smaller than the other port and having the front edge thereof in a plane which passes transversely of the casing and through the front edge of the other port; a valve in said valve chamber adapted to control both of said ports; and means to operate said valve.

In witness that I claim the foregoing I have hereunto subscribed my name this 4th day of March, 1913.

JOHN N. HOGG.

Witnesses:
HENRY V. WALL,
FRANK WATERFIELD.